US012612940B2

(12) United States Patent
Seibert

(10) Patent No.: US 12,612,940 B2
(45) Date of Patent: Apr. 28, 2026

(54) SOCKET JOINT

(71) Applicant: FEDERAL-MOGUL MOTORPARTS LLC, Southfield, MI (US)

(72) Inventor: Trevor Seibert, Maryland Heights, MO (US)

(73) Assignee: FEDERAL-MOGUL MOTORPARTS LLC, Southfield, MI (US)

( * ) Notice: Subject to any disclaimer, the term of this patent is extended or adjusted under 35 U.S.C. 154(b) by 313 days.

(21) Appl. No.: 18/512,415

(22) Filed: Nov. 17, 2023

(65) Prior Publication Data

US 2025/0163955 A1 May 22, 2025

(51) Int. Cl.
*F16C 11/06* (2006.01)

(52) U.S. Cl.
CPC ................................. *F16C 11/0623* (2013.01)

(58) Field of Classification Search
None
See application file for complete search history.

(56) References Cited

U.S. PATENT DOCUMENTS 2,766,079 A * 10/1956 Browne .............. F16C 11/0614
403/77
3,269,758 A * 8/1966 Ulderup ............. F16C 11/0609
403/140
3,539,210 A * 11/1970 Fister ................. F16C 11/0647
403/132

4,120,597 A * 10/1978 Millard ............... F16C 11/0628
403/138
4,209,868 A * 7/1980 Tada ........................ F16M 7/00
248/182.1
4,511,276 A * 4/1985 Doutt .................. F16C 11/0661
403/135
4,704,043 A * 11/1987 Hackman ................ F16C 11/06
403/56
5,116,159 A * 5/1992 Kern, Jr. ............. F16C 11/0642
29/898.047
5,247,848 A 9/1993 Sabel
5,642,956 A * 7/1997 Hale ....................... F16F 15/08
403/56
5,839,845 A * 11/1998 Kincaid ............. F16C 11/0647
403/135
5,885,022 A 3/1999 Maughan
(Continued)

FOREIGN PATENT DOCUMENTS

| CN | 205298244 U | 6/2016 |
|---|---|---|
| DE | 102010031995 A1 | 5/2012 |
| KR | 100752619 B1 | 8/2007 |

*Primary Examiner* — Daniel J Wiley
(74) *Attorney, Agent, or Firm* — Reising Ethington P.C.

(57) ABSTRACT

A socket joint having a stud, a bearing, and a housing. The housing extends from an end portion to an exit portion having an exit surface. The housing has an internal bore with a housing internal bore diameter. The bearing and the housed stud portion are located at least partially in the internal bore, and the housing internal bore diameter is consistent or at least partially expanding between the exit surface of the bearing and the exit surface of the housing so as to have a radially unobstructed stud swing area at the exit portion of the housing. The bearing may be mechanically interlocked with the internal bore of the housing. The compact structure can help with achieving a desired preload while maximizing stud swing.

18 Claims, 4 Drawing Sheets

(56)                    References Cited

U.S. PATENT DOCUMENTS 6,422,779  B1 *    7/2002  Spagnuolo ............. F16C 25/04
                                                              403/138
7,644,500  B2 *    1/2010  Schmidt ............. F16C 11/0685
                                                            29/898.044
8,764,336  B2 *    7/2014  Kraatz ................ F16C 11/0647
                                                              403/143
8,967,868  B2      3/2015  Wright
2018/0149190  A1   5/2018  Henriksen

* cited by examiner

SOCKET JOINT

TECHNICAL FIELD

This disclosure generally relates to vehicle components and, in particular, to socket joints used in steering and suspension systems.

BACKGROUND

With some vehicle components, such as an inner tie rod end, space constraints can inhibit desired performance. Traditionally, there have been two designs of inner tie rods used in the market. Both have a region of the inner tie rod that extends beyond the face of the stud exit bearing.

The first design of an inner tie rod (see e.g., FIG. 1A) uses a stud exit bearing, a back bearing opposite the stud exit bearing, a preload component, and a housing with a crimp or swage feature on the stud exit side of the housing that secures all of the components into the assembly.

The second design (see e.g., FIG. 1B) uses a stud exit bearing with a radially extending step section in the housing to secure said bearing, a back bearing opposite the stud exit bearing, a preload component, as well as a cover plate and crimp or swage closure method on the back side of the housing that secures all of the components into the assembly.

Without sophisticated assembly, equipment both of these designs may undesirably impact stud rotational torque, bearing clearance and impact stud swing based on design elements.

SUMMARY

According to an embodiment, there is provided a socket joint comprising a stud having a housed stud portion and an attachment stud portion, and a bearing at least partially surrounding the stud at the housed stud portion. The bearing has an end surface and an exit surface, the exit surface being opposite from the end surface. The socket joint includes a housing at least partially surrounding the bearing, the housing extending from an end portion to an exit portion having an exit surface, the housing having an internal bore with a housing internal bore diameter, with the bearing and the housed stud portion being located at least partially in the internal bore. The housing internal bore diameter is consistent or at least partially expanding between the exit surface of the bearing and the exit surface of the housing so as to have a radially unobstructed stud swing area at the exit portion of the housing.

In some embodiments, the internal bore of the housing is configured to provide a stud swing maximum between 20-30°.

In some embodiments, at least a portion of the bearing has a mechanical interlock to the internal bore of the housing.

In some embodiments, a proof load of the mechanical interlock exceeds a stud pullout force amount.

In some embodiments, the bearing is a split bearing comprising an end bearing and an exit bearing, an outer diameter of the exit bearing having the mechanical interlock with the internal bore of the housing.

In some embodiments, the mechanical interlock is a threaded engagement.

In some embodiments, the exit bearing is threaded and the end bearing is not threaded.

In some embodiments, the exit portion is configured without a crimp or a swaged lip.

In some embodiments, a preload step delineates the end portion and the exit portion.

In some embodiments, the stud has a ball having a ball diameter and the end portion has an end portion diameter, wherein the ball diameter is between the internal bore diameter and the end portion diameter.

In some embodiments, a radial extent of the preload step is sized with a longest radial extent of the bearing.

In some embodiments, the exit surface of the housing is primarily radially extending.

In some embodiments, the exit surface of the bearing includes a plurality of drive holes.

In some embodiments, the end portion of the housing is a part of a tie rod end portion.

In some embodiments, there is an interior bearing between the bearing and the internal bore of the housing.

In some embodiments, the bearing has a heat-treated spherical stud contact surface.

In an embodiment, there is provided a socket joint comprising a stud having a housed stud portion and an attachment stud portion, and a bearing at least partially surrounding the stud at the housed stud portion. The socket joint includes a housing at least partially surrounding the bearing, the housing extending from an end portion to an exit portion, the exit portion having a radially unobstructed stud swing area. The housing has an internal bore with the bearing and the housed stud portion being located at least partially in the internal bore. At least a portion of the bearing has a mechanical interlock to the internal bore of the housing.

In some embodiments, the mechanical interlock is a threaded engagement or an adhesive layer.

In an embodiment, there is a socket joint comprising a stud having a housed stud portion and an attachment stud portion, a bearing at least partially surrounding the stud at the housed stud portion, and a housing having an internal bore at least partially surrounding the housed stud portion of the stud. The internal bore of the housing is configured to provide a stud swing maximum between 20-30°. At least a portion of the bearing has a mechanical interlock to the internal bore of the housing.

In some embodiments, the internal bore has a housing internal bore diameter that is consistent or at least partially expanding between the exit surface of the bearing and the exit surface of the housing so as to have a radially unobstructed stud swing area at an exit portion of the housing.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Preferred example embodiments will hereinafter be described in conjunction with the appended drawings, wherein like designations denote like elements, and wherein.

DETAILED DESCRIPTION

The socket joint embodiments described herein can enhance several aspects of inner tie rod performance and design compared to the two traditional designs in the market currently. The design process is simplified by using thread proof load calculations to identify the correct thread size appropriate for the target stud pullout (tension load) requirement of the desired implementation. Obtaining the appropriate stud articulation effort may also be simplified, and more accurate, by using the threaded bearing to set preload instead of a crimping press capturing internal components with a pre-determined closure force.

Stud swing, in some embodiments, may also be enhanced by having less of a housing presence beyond the threaded exit bearing. In at least some embodiments, there is no need for a crimp (swage) profile or housing section to retain the stud exit side bearing.

Figure 1A:
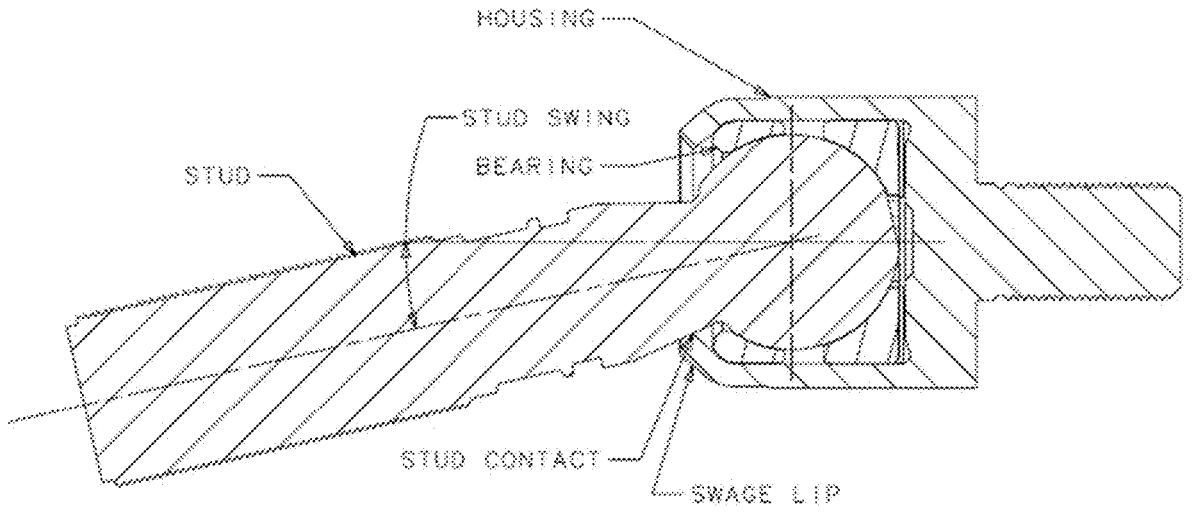
FIG. 1A is a cross-sectional view of a socket joint in accordance with the prior art.

FIG. 1A illustrates a prior art socket joint where the preload is set by crimping the housing at the housing swage lip at the stud exit side of the housing, as indicated. This arrangement can help properly position and tension the various components of the socket joint; however, the amount of stud swing may be limited if the stud diameter cannot be reduced and the housing crimp size is such that it cannot be reduced due to stud pull out requirements (tension load) of the desired implementation. In this embodiment, the maximum stud swing, as shown, is only about 12°. It may be desirable to facilitate a larger stud swing while maintaining a desired preload amount, as with the embodiments described herein.

Figure 1B:
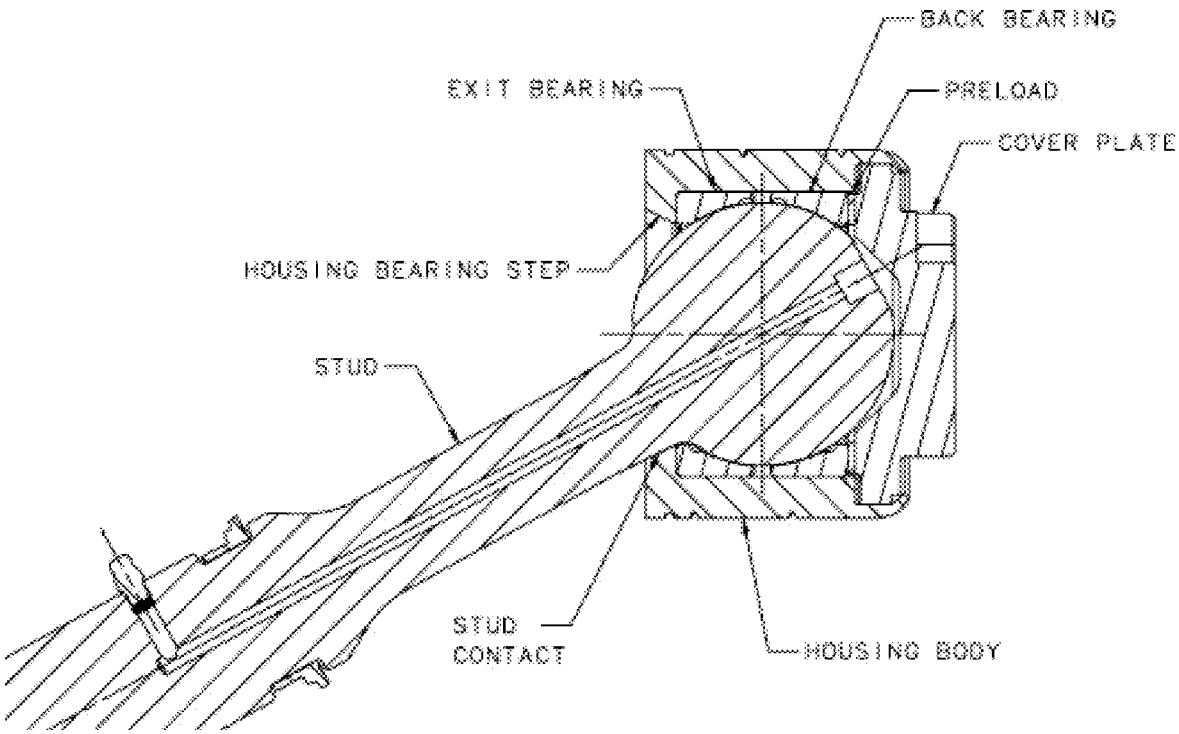
FIG. 1B is a cross-sectional view of another socket joint in accordance with the prior art.

FIG. 1B illustrates another example of a prior art socket where the preload is set by crimping the housing at the housing swage lip at the back of the housing, opposite the stud exit side of the housing, as indicated. This arrangement can help properly position and tension the various components of the socket joint; however, the amount of stud swing on this design will likely be contingent on the housing stud exit geometry, stud diameter at the housing opening, and the stud exit bearing throat diameter. In this embodiment, the maximum stud swing is greater than that shown in FIG. 1A; however, since design requirements differ depending on the desired implementation, it may be advantageous to facilitate a larger stud swing while maintaining a desired preload amount, as with the embodiments described herein.

Figure 2:
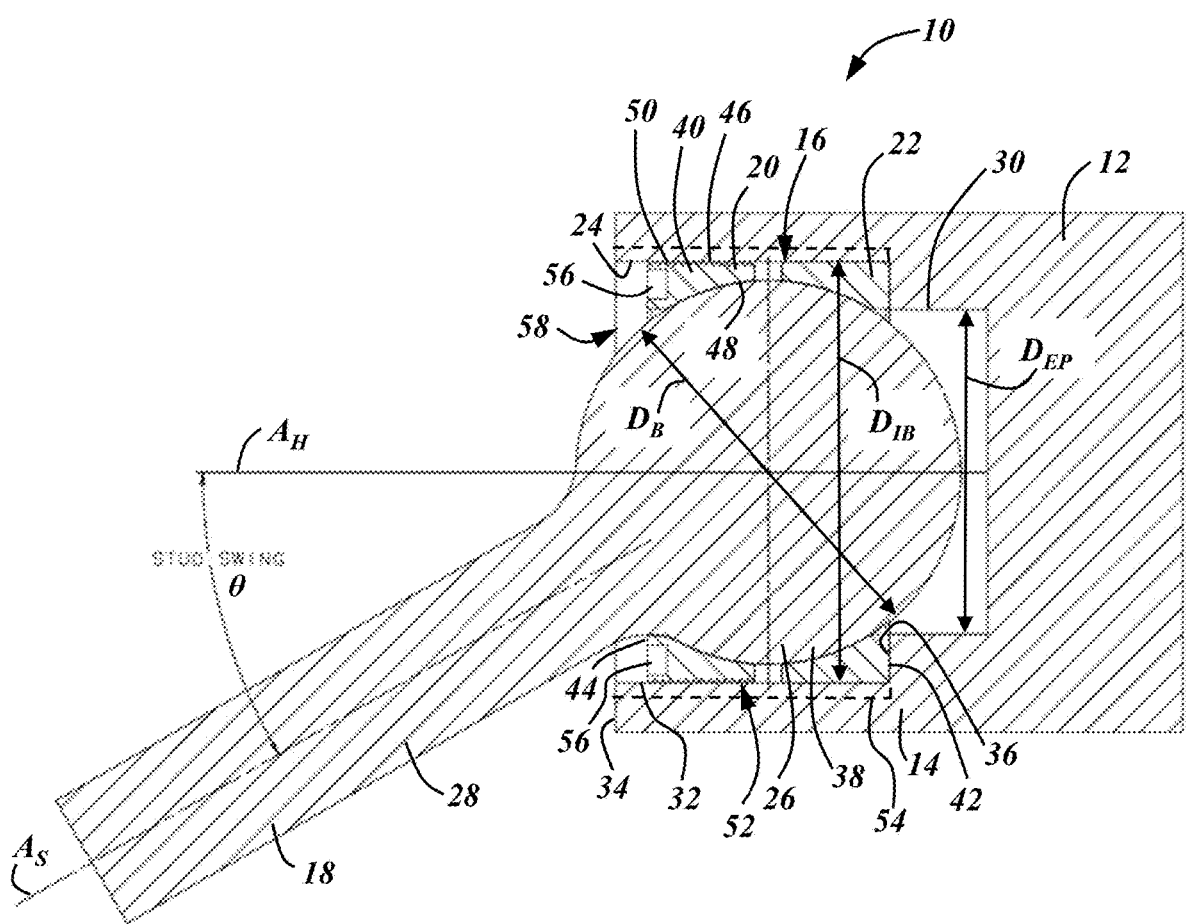
FIG. 2 is a cross-section view of a socket joint in accordance with one embodiment.

FIG. 2 illustrates a socket joint 10 in accordance with one embodiment. As described herein, the socket joint 10 advantageously improves performance when used as a ball joint for an inner tie rod end 12, which is partially illustrated. In some embodiments, the joint 10 can be assembled directly into a steering cylinder without a traditional tie rod housing or assembly process. However, it is possible for the socket joint 10 to be used in other configurations such as ones with an externally threaded region common on automotive rack and pinion applications or similar implementations, beyond just tie rod ends. Further, features relating to the joint 10 may be useful in other joint applications. Accordingly, it is possible to manufacture alternately configured suspension and/or steering components in accordance with the teachings herein. For example, the joint 10 may include any moveable socket configuration, such as those without a ball stud, and is not limited to the explicitly illustrated joint shown in the figures and described herein.

The socket joint 10 includes a housing 14 at least partially surrounding a bearing 16 and a stud 18. In the illustrated embodiment, the bearing 16 is a split bearing configuration with an exit bearing 20 and an end bearing 22. The housing 14 bearing 16, and/or stud 18 can include various threads, grooves, projecting portions, etc., beyond what is particularly illustrated. The socket joint 10 may also include other features, such as a dust boot or other operational-based features depending on the desired use and placement of the joint.

The housing 14 is a generally circular cylindrical component that surrounds the internal components of the joint 10. The housing 14 has an internal bore 24 having an internal bore diameter $D_{IB}$. The internal bore 24 generally surrounds the bearing 16 and the stud 18 at a housed stud portion 26 of the stud, which opposes an attachment stud portion 28 that extends axially out of the housing 14. The housing 14 also has a central housing axis $A_H$ that extends through the geometric center of the internal bore 24.

Structurally, the housing 14 extends from an end portion 30 to an exit portion 32 having an exit surface 34. In this particular embodiment, the end portion 30 is integrally connected, or in other words, is an integral portion of, the inner tie rod end 12. A preload step 36 delineates the end portion 30 and the exit portion 32, and provides a radially extending stop for the end bearing 22. As shown in FIG. 2, the longest radial extent of the bearing 22 is sized with a radial extent of the preload step 36 in such a way so as to maximize surface contact between the radial extent of the bearing 22 and the radial extent of the preload step 36. Accordingly, the longest radial extent of the bearing 22 is configured to fully extend along the radial extent of the preload step 36. The end portion 30 adjacent the preload step 36 has an end portion diameter $D_{EP}$, which in this embodiment, is less than both the diameter of the internal bore $D_{IB}$, which generally defines the exit portion 32 and thus the exit portion diameter. Additionally, in this embodiment, the stud 18 has a ball 38 which makes up a majority of the housed stud portion 26. The ball 38 has a ball diameter DB, which is between the diameter of the end portion 30 (DEB) and the diameter of the internal bore 24 ($D_{IB}$). The respective diameters in this embodiment are taken at their longest extent, and the radial extents or axial extents relate to extending outwards from or parallel to the housing axis $A_H$, respectively.

The bearing 16 is situated in the internal bore 24 of the housing 14. The discussion herein focuses more extensively on the exit bearing 20, but the teachings relating to the exit bearing 20 may be applicable as well to the end bearing 22, or a bearing not having a split configuration as illustrated. The bearing 20 in the illustrated embodiment is manufactured from a metal-based material, such as carburizing steel (e.g., AISI 8620), but other operable materials are certainly possible. Additionally, as detailed further below, the exit bearing 20 is threaded, whereas the end bearing 22 is not. This provides a better locking arrangement at the exit portion 32 of the housing 14 such that a separate cover plate or housing closure may not be needed.

Figure 3:
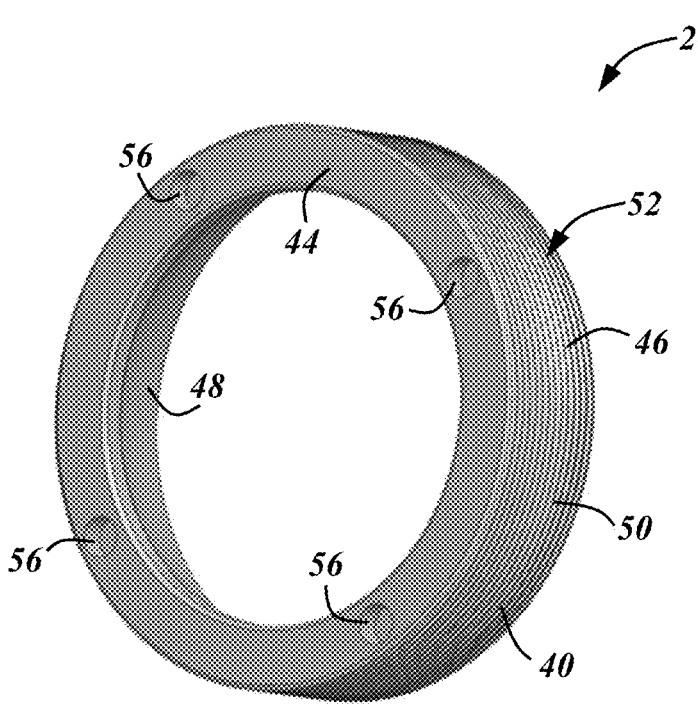
FIG. 3 is a perspective rendering of an exit surface of a bearing of the socket joint of FIG. 2.
Figure 4:
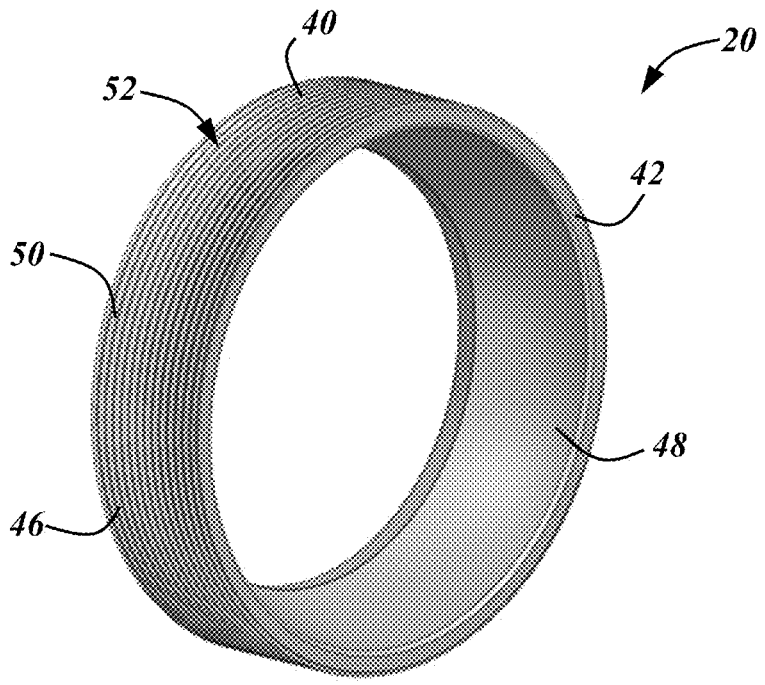
FIG. 4 is a perspective rendering of an end surface of the bearing of FIGS. 2 and 3.

With reference to FIGS. 2-4, the bearing 20 has a bearing body 40 which extends from an end surface 42 to an exit surface 44. As with the housing exit surface 34, the exit surface 44 of the bearing 20 is primarily radially extending (e.g., a majority of the surface 44 extends in a radial direction). The end surface 42 of the bearing 20 is axially opposite from the exit surface 44 and also extends primarily radially. Between the end surface 42 and the exit surface 44, there is an axially extending outer diameter surface 46 and an opposite spherical stud contact surface 48. The outer diameter surface 46 interfaces with the internal bore 24 of the housing 14, and the spherical stud contact surface 48 interfaces with the housed stud portion 26 of the stud 18. The stud 18 and/or the bearing 20 may be heat treated, via an induction heat treatment process or the like, to help with hardening and wear resistance. An induction heat treatment process can increase fatigue strength on wear surfaces such as the housed stud portion 26 and the spherical stud contact surface 48.

The outer diameter surface 46 includes a mechanical interlock 50 that engages with the internal bore 24 of the housing 14. In this embodiment, the mechanical interlock 50 includes a plurality of threads 52 that create a threaded engagement with the bore 24. In other embodiments, the mechanical interlock 50 may take alternate forms, or may be added to the threaded engagement, such as an adhesive layer or one or more locking tabs, to cite a few potential examples. In some implementations, the threads 52 may be used with an adhesive layer such as a cyanoacrylate layer, such that the mechanical interlock 50 is further strengthened. A secondary method of retention may be beneficial with threads 52 to help keep the threads from becoming loose in service. Other forms for the mechanical interlock 50 are certainly possible, such as a low profile jam nut or a set screw to cite a few examples. In yet other embodiments, one or more locking pins, one or more roll pins, a staking process, or even a low profile crimp may be used as a primary and/or secondary mechanical retention feature, to cite a few non-limiting examples. In many of the embodiments, the mechanical lock 50 is imparted by a structural feature of the bearing 20 itself, not just via a feature on the housing 14 (e.g., swaged lip or crimp).

In some embodiments, it may be advantageous to have the mechanical interlock 50 have a proof load that exceeds a pullout force for the stud 18. In the illustrated embodiment, the size of threads 52 can determine the amount of stud 18 pullout force. Choosing a thread size having a proof load in excess of the stud 18 pullout force requirement is thus advantageous. This arrangement allows the exit portion 32 of the housing 18 to be configured without a crimp or swaged lip, as shown in FIG. 1, since the mechanical lock 50 between the bearing 20 and the housing 14 can maintain a desired arrangement for the internal components of the joint 10. This, in turn, can allow for a greater stud swing angle θ, as detailed further below. The mechanical lock 50 may also help control the stud 18 articulation torque.

FIG. 2 also shows an optional interior bearing 54 that may be used between the bearing 20 and the internal bore 24 of the housing 14. The interior bearing 54 may be clearance fit or interference fit within the internal bore 24 of the housing 14. The interior bearing 54 may have a threaded interior diameter to engage with the threads 52 of the bearing 20. An interior bearing 54 may be used in implementations to help control stud ball 38 and exit bearing 20 concentricity without undesirably impacting the rotational or articulation torque of the stud 18.

Whether using the optional interior bearing 54 or installing directly into the internal bore 24 of the housing 14, it may be helpful to include mounting features to help facilitate more efficient installation. In this embodiment, a plurality of drive holes 56 are located on the radially extending exit surface 44 of the bearing 20. The drive holes 56 may be configured to accommodate a spanner wrench or other operational tool to help facilitate engagement of the mechanical interlock 50. The preload can be set during assembly by threading the bearing 20 into the housing and reducing clearance between the stud ball 38 and the bearing set 16. Accordingly, the assembly method may be simplified through the use of a torque wrench and spanner tool, as opposed to more sophisticated assembly equipment. For example, sophisticated presses may be required for crimped housings, as shown in FIG. 1A.

The joint 10 allows for a set preload for the bearing 20, while withstanding tension loads and proper positioning during service, and advantageously allows for articulation of the stud 18 without interference. At the exit portion 32 of the housing 14, there is a radially unobstructed stud swing area 58. As shown in the embodiment of FIG. 2, compared with FIG. 1, the radially unobstructed stud swing area 58 includes a portion of the housing internal bore diameter $D_{IB}$ that is consistent between the exit surface 44 of the bearing 20 and the exit surface 34 of the housing 14. In some embodiments, the housing internal bore diameter $D_{IB}$ is at least partially expanding at the radially unobstructed stud swing area 58. As shown, unlike FIG. 1, there is no crimped or swaged edge. Instead, in FIG. 2, the exit surface 34 of the housing is primarily radially extending providing a larger stud swing area 58 than crimped or swaged ends. It should be noted, however, that with threaded arrangements in the internal bore 24, the radial extent may be defined at the top of the threads such that the arrangement still includes a consistent or at least partially expanded radial extent. Additionally, in some embodiments, the exit bearing 20 may be located closer to or directly adjacent to the exit surface 34 of the housing than what is particularly illustrated. Accordingly, the axial length of the housing 14 and internal bore 24 may vary, thereby changing the arrangement of the radially unobstructed stud swing area 58 from what is explicitly shown in FIG. 2. Also, as shown when comparing FIGS. 1A and 1B with FIG. 2, the stud 18 is able to swing in the present embodiment within the radial extending space that is generally defined as the radial extent of the bearing exit surface 44, whereas with FIGS. 1A and 1B, the housing blocks and projects inwardly toward the stud so as to block this radial space.

The radially unobstructed stud swing area 58 of FIG. 2 allows for a stud swing angle θ that may be greater than those with crimped or swaged housings, such as that shown in FIG. 1A. In FIG. 1A, the maximum stud swing angle is shown at about 12°, whereas with the radially unobstructed swing area 58 of FIG. 2, the maximum stud swing angle is about 20-30°, or more particularly 25-30°, or specifically, 27° in the illustrated embodiment. The stud swing angle is typically the amount the stud axis As can pivot with respect to the housing axis $A_H$. The larger stud swing angle θ embodiments of the present application may be accomplished at least partially through the use of the mechanically locked exit bearing 20, not just a mechanical lock imparted from the housing structure, which may obviate the need for a threaded cover plate or the like located between the bearing exit surface 44 and the housing exit surface 34. Without a threaded cover plate, the radially unobstructed stud swing area 58 can be larger without sacrificing proper load management. Accordingly, the compact structure can help maintain performance and load requirements while facilitating a greater degree of stud swing. The mechanically locked exit bearing 20, having the threads 52, can adequately set the preload while not overly interfering with the radial space at the exit portion of the housing 14. Stud swing increase may also be impacted by other variables of the joint design.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A socket joint, comprising:
a stud having a housed stud portion and an attachment stud portion;
a bearing at least partially surrounding the stud at the housed stud portion, the bearing having an end surface and an exit surface, the exit surface being opposite from the end surface; and
a housing at least partially surrounding the bearing, the housing extending from an end portion to an exit portion having an exit surface, the end portion having an end portion diameter, the housing having an internal bore with a housing internal bore diameter, the housing internal bore diameter being greater than the end portion diameter, the bearing and the housed stud portion being located at least partially in the internal bore, wherein the housing internal bore diameter is consistent or at least partially expanding between the exit surface of the bearing and the exit surface of the housing so as to have a radially unobstructed stud swing area at the exit portion of the housing, wherein a preload step delineates the end portion and the exit portion, and wherein the preload step is a radially extending stop for the end surface of the bearing.

2. The socket joint of claim 1, wherein the internal bore of the housing is configured to provide a stud swing maximum between 20-30°.

3. The socket joint of claim 1, wherein at least a portion of the bearing has a mechanical interlock to the internal bore of the housing.

4. The socket joint of claim 3, wherein a proof load of the mechanical interlock exceeds a stud pullout force amount.

5. The socket joint of claim 3, wherein the bearing is a split bearing comprising an end bearing and an exit bearing, an outer diameter of the exit bearing having the mechanical interlock with the internal bore of the housing.

6. The socket joint of claim 5, wherein the mechanical interlock is a threaded engagement.

7. The socket joint of claim 5, wherein the exit bearing is threaded and the end bearing is not threaded.

8. The socket joint of claim 1, wherein the exit portion is configured without a crimp or a swaged lip.

9. The socket joint of claim 1, wherein the stud has a ball having a ball diameter, wherein the ball diameter is between the internal bore diameter and the end portion diameter.

10. The socket joint of claim 1, wherein a radial extent of the preload step is sized with a longest radial extent of the bearing.

11. The socket joint of claim 1, wherein the exit surface of the housing is primarily radially extending.

12. The socket joint of claim 1, wherein the exit surface of the bearing includes a plurality of drive holes.

13. The socket joint of claim 1, wherein the end portion of the housing is a part of a tie rod end portion.

14. The socket joint of claim 1, comprising an interior bearing between the bearing and the internal bore of the housing.

15. The socket joint of claim 1, wherein the bearing has a heat-treated spherical stud contact surface.

16. A socket joint, comprising:
a stud having a housed stud portion and an attachment stud portion;
a bearing at least partially surrounding the stud at the housed stud portion; and
a housing at least partially surrounding the bearing, the housing extending from an end portion to an exit portion, the end portion having an end portion diameter, the housing having an internal bore with a housing internal bore diameter, the housing internal bore diameter being greater than the end portion diameter, the exit portion having a radially unobstructed stud swing area, the housing having an internal bore with the bearing and the housed stud portion being located at least partially in the internal bore, wherein at least a portion of the bearing has a mechanical interlock to the internal bore of the housing, wherein a preload step delineates the end portion and the exit portion, and wherein the bearing makes surface contact with a radial extent of the preload step.

17. The socket joint of claim 16, wherein the mechanical interlock is a threaded engagement or an adhesive layer.

18. A socket joint, comprising:
a stud having a housed stud portion and an attachment stud portion;
a bearing at least partially surrounding the stud at the housed stud portion; and
a housing having an internal bore at least partially surrounding the bearing and the housed stud portion of the stud, wherein the internal bore of the housing is configured to provide a stud swing maximum between 20-30°, and wherein at least a portion of the bearing has a mechanical interlock to the internal bore of the housing, wherein the internal bore has a housing internal bore diameter that is consistent or at least partially expanding between the exit surface of the bearing and the exit surface of the housing so as to have a radially unobstructed stud swing area at an exit portion of the housing.

* * * * *